(12) United States Patent
Goradia

(10) Patent No.: US 12,171,236 B2
(45) Date of Patent: Dec. 24, 2024

(54) LIGHT STABLE SILVER CONTAINING NEAR NEUTRAL pH DISINFECTANT AND METHOD OF PREPARATION

(71) Applicant: Prerna Goradia, Mumbai (IN)

(72) Inventor: Prerna Goradia, Mumbai (IN)

( * ) Notice: Subject to any disclaimer, the term of this patent is extended or adjusted under 35 U.S.C. 154(b) by 33 days.

(21) Appl. No.: 17/737,982

(22) Filed: May 5, 2022

(65) Prior Publication Data
US 2022/0369645 A1     Nov. 24, 2022

(30) Foreign Application Priority Data
May 21, 2021    (IN) .............................. 202121022861

(51) Int. Cl.
*A01N 59/16*     (2006.01)
*A01N 25/04*     (2006.01)
*A01N 25/22*     (2006.01)

(52) U.S. Cl.
CPC .............. *A01N 59/16* (2013.01); *A01N 25/04* (2013.01); *A01N 25/22* (2013.01)

(58) Field of Classification Search
CPC ......... A01N 59/16; A01N 25/04; A01N 25/22
See application file for complete search history.

(56) References Cited

U.S. PATENT DOCUMENTS

| | | | |
|---|---|---|---|
| 10,144,908 B2* | 12/2018 | Chandar | C11D 9/26 |
| 2003/0205136 A1* | 11/2003 | McNulty | B01D 19/0005 |
| | | | 96/202 |
| 2012/0282348 A1* | 11/2012 | Yates | A61P 17/02 |
| | | | 424/618 |
| 2015/0306055 A1* | 10/2015 | Percival | A01N 59/00 |
| | | | 424/668 |

OTHER PUBLICATIONS

PVP hydrogen bonding Barhma et al., Bull. Mater. Sci., vol. 33, No. 2, Apr. 2010, pp. 89-95. © Indian Academy of Sciences. 89-95 (Year: 2010).*
EN 1040:2005 https://web.archive.org/web/20211026141740/https://www.viroxylabs.com/microbiological-testing-services/disinfectant-efficacy-testing/en-10402005/ (accessed Oct. 27, 2023) (Year: 2021).*

* cited by examiner

*Primary Examiner* — Robert A Wax
*Assistant Examiner* — John W Lippert, III
(74) *Attorney, Agent, or Firm* — Alley IP

(57) ABSTRACT

A light stable, environmentally friendly, broad spectrum antimicrobial disinfectants comprising of active metal ions and method of preparing the same are provided. The compositions are non-toxic, cost-effective formulations, comprising of metal ions, biopolymer, and complexing agent. The compositions are very effective with the dosing and treatment regime designed to give a 6-log reduction in bacteria and virus count and also expected to yield 30 days or more of residual efficacy.

12 Claims, 2 Drawing Sheets

LIGHT STABLE SILVER CONTAINING NEAR NEUTRAL pH DISINFECTANT AND METHOD OF PREPARATION

RELATED APPLICATIONS

This application claims priority under 35 U.S.C. § 119 to co-pending IN Application 202121022861, filed May 21, 2021. This IN Application and PCT Application PCT/IN2022/050091 filed Feb. 3, 2022 are incorporated by reference herein in their entireties.

BACKGROUND

Regular sanitization and disinfection of the surface and premises we work upon is the need of the hour in the Covid era. However, the traditional chemicals used for disinfection such as the benzothiazoles, parabens, hypochlorites, peroxides, quaternary ammonium compounds etc. may not be safe and are toxic for long term usage over a period of time. Thus, there is a need for safe and benign disinfectants for regular usage. Silver compounds have been known for a long time for their natural anti-microbial activity and have been used as anti-bacterial agents in various compositions, where germs do not tend to survive in its presence and do not show side effects on the human body.

It is reported that the usage of water-soluble silver compounds as effective anti-microbials, generally requires their content to be more than 10% in these formulations. Prolong usage of these formulations may lead to the accumulation of silver in the human body, with subcutaneous accumulation as well, which in turn might lead to skin discoloration. Considering these factors, there is the need of non-toxic formulations with near neutral pH, effectively able to neutralize microorganisms without having any environmental hazards and non-toxic to the skin.

References have been made to the following literature:

AU2005322839 relates to a colorless composition comprising metal particles (e.g., silver nanoparticles) and water, wherein said particles comprise an interior of elemental metal (e.g., silver) and an exterior of metal oxide (e.g., one or more silver oxide(s)). The silver nanoparticles composition disclosed in the prior art is a complex one where the toxicity of nanoparticles is a severe issue.

KR20120035689 relates to a formulation comprising Ag atoms of the resulting nanoparticle size with secondary purified water and 3% of 35% hydrogen peroxide and also chitosan, vitamin C with concentrations of silver at 1-100 ppm. The resultant formulation in the prior art is a toxic silver colloidal silver peroxide solution for the production of ionic solution and unsafe to the human body.

JP5693470 relates to silver ion-based disinfectant composition exhibiting a synergistic effect in isotonic or hypertonic media when combined with low concentrations of menthol, provided that silver ions are typical for disinfectant purposes, where it is present at a lower concentration than is used in.

CA2500836 discloses a pharmaceutical composition, comprising of
  a pharmaceutically acceptable carrier; and a silver-containing material in the pharmaceutically acceptable carrier, wherein the pharmaceutical composition comprises from about 0.001 weight percent to about 50 weight percent of the silver-containing material.

U.S. Pat. No. 7,311,927 relates to a liquid antiseptic and cleanser having improved long-term stability including at least the following principal ingredients: deionized water; silver ion, polypectate, and ethylenediaminetetraacetic acid (EDTA). Presently preferred embodiments of the technology also include glycerin; 1,2-propanediol (a.k.a. propylene glycol); at least one surfactant from any of the families of alkylsulfates, sulfonates, alkanolamides, betaines, amine oxides, sarcosinates and sulfosuccinates; and a buffering compound sufficient to achieve a pH value within a range of 7.2 to 7.8. The silver salts used in the prior art comprises chelated silver ions generated using aqueous ammonium which are not very stable due to a gradual decomposition of the polypectate molecules or/and the gradual formation of extraneous compounds having greater affinity for the silver ions than the polypectate molecules. The greater the heat or the greater the energy of the incident light, the more rapid the decomposition.

U.S. Ser. No. 10/251,392 relates to methods and compositions for antimicrobial devices comprising salts or complexes of silver, copper or zinc. In one aspect, the metal salts may comprise metal salts of saccharin, acesulfame, long chain fatty acids, and alkyl dicarboxylic acids.

This background provides a useful baseline or starting point from which to better understand some example embodiments discussed below. Except for any clearly-identified third-party subject matter, likely separately submitted, this Background and any figures are by the Inventor(s), created for purposes of this application. Nothing in this application is necessarily known or represented as prior art.

SUMMARY

Example embodiments generally relate to the field of non-toxic disinfectants. More specifically, example embodiments relate to light stable, environment-friendly antimicrobial disinfectants and sanitizer compositions with neutral pH, comprising of active metal ions and method of preparing the same.

The principal object of the embodiments herein is to overcome the drawbacks in the prior art and provide a composition for light stable and environmentally friendly disinfectants and sanitizers, with neutral pH comprising of active metal ions with bio polymer and chelating agent and method of preparing the same. The silver salts used in the prior art comprise organic silver molecules which have solubility issues, but example embodiments may be a stable, aqueous composition with long lasting effects. Example embodiments provide a heat and light stable composition with a prolong stability.

Example embodiments overcome the problems faced in the prior art and disclose a composition which can effectively neutralize microorganisms on the hard surfaces by providing for a stabilized, non-toxic, antimicrobial aqueous disinfectant comprising of silver salts with bio polymer and chelating agent. Example embodiments may provide a gradual release of silver with the complexing agent, where the silver ions are bioavailable and yield a stable and highly effective colorless composition.

Accordingly, example embodiments relate to a non-toxic disinfectant composition with neutral pH, comprising of active metals salts for disinfection and method of preparing the same. The resultant formulation is colorless and odorless.

An example embodiment discloses an antimicrobial disinfectant composition comprising: a silver salt 0.1-2% (w/v); a chelating agent 1-10% (w/v); and a polymer 1-10% (w/v); wherein the pH of the disinfectant composition is adjusted to greater than or equal to 7 and less than or equal to 9. The pH adjusters such as phosphate buffers, sodium and potassium hydroxide may be used to maintain the pH around neutral.

Another embodiment discloses an antimicrobial disinfectant composition wherein the silver salt is selected from a group comprising water soluble silver salts such as silver nitrate, silver chloride, silver fluoride, silver sulfate/sulfide, silver acetate, and silver lactate. Further, the chelating agent is selected from a group comprising of ethylenediaminetetraacetic acid (EDTA) salts such as disodium EDTA, sodium calcium edetate, and tetrasodium EDTA, dimercaptosuccinic acid, dimercapto-propane sulfonate, salts of diethylene triamine pentacetic acid and dimercaptol, but not limited to; where the chelating agents work by binding to metals, with the role is to keep the silver ions bound and prevent its oxidation. The polymer in the composition is selected from a group comprising hydrophilic bio polymers such as poly vinyl pyrrolidone, polyethylene glycol, poly vinyl alcohol and combinations thereof, but not limited to.

Example embodiments include a process of preparing an antimicrobial disinfectant composition, comprising the steps of: a) weighing out 70-90% of the water required in the container and deoxygenating it using nitrogen gas; b) preparing the matrix by addition of chelating agents in the deoxygenated water obtained in step a; c) adding silver salt to the solution obtained in step b); and d) adding the bio-polymer to the composition obtained in step c) with gentle stirring and making up the final volume with water. Further, the pH adjusters are added to maintain the pH in the range of 7 to 9.

Another example embodiment discloses the method wherein the polymer added in the range 1-10%, makes hydrogen bonds with the surface to further improve disinfectability and to provide residual stability in the composition.

Another example embodiment discloses an aqueous antimicrobial disinfectant composition, which may comprise powdered form, tablet or capsule containing the antimicrobial powder, or antimicrobial solutions in the form as aerosols, infusions, sprays, mist, drops, or one or more liquids formulations, but not limited to. Further, the disinfectant shows instant kill activity with decontaminating the surface within 30 seconds of exposure time, wherein the surface is a hard surface.

BRIEF DESCRIPTIONS OF THE DRAWINGS

Example embodiments will become more apparent by describing, in detail, the attached drawings, wherein similar elements are represented by similar reference numerals. The drawings serve purposes of illustration only and thus do not limit example embodiments herein. Elements in these drawings may be to scale with one another and exactly depict shapes, positions, operations, and/or wording of example embodiments, or some or all elements may be out of scale or embellished to show alternative proportions and details.

DETAILED DESCRIPTION

Figure 1:
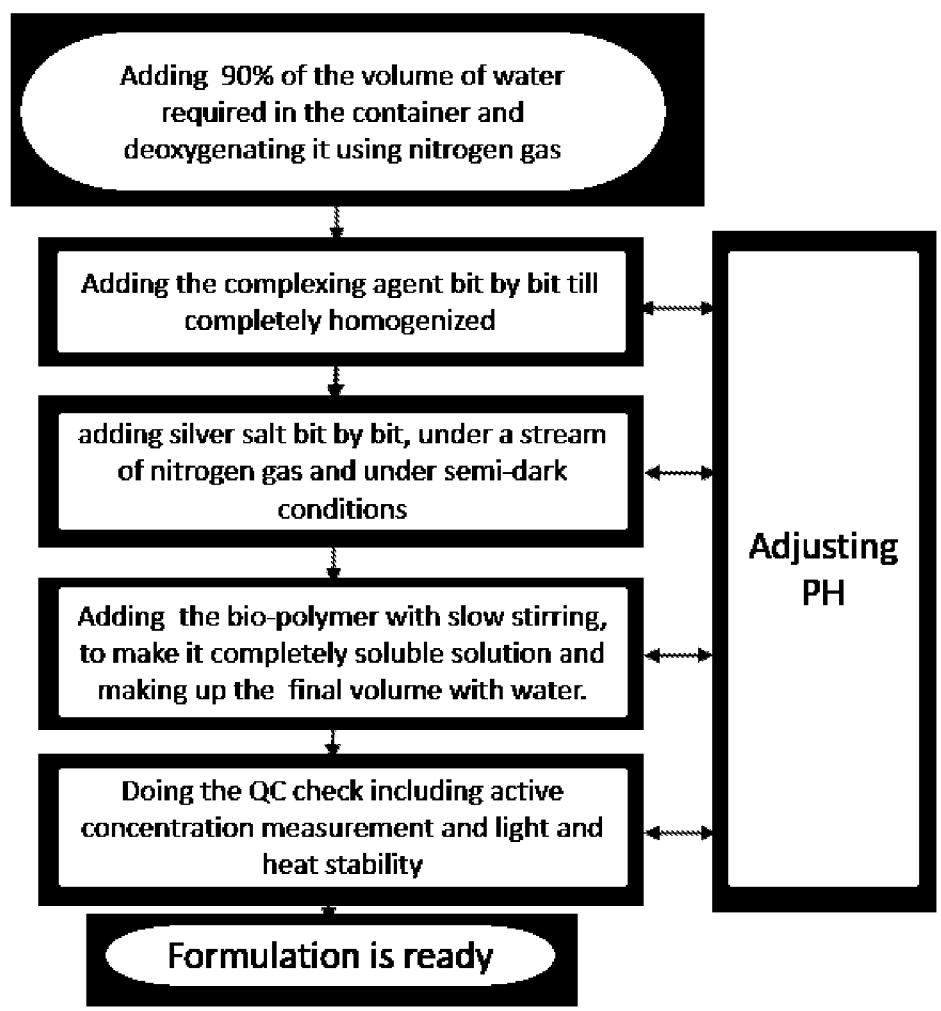
FIG. 1 illustrates the methodology for the preparation of the composition, in accordance with an example embodiment.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

Membership terms like "comprises," "includes," "has," or "with" reflect the presence of stated features, characteristics, steps, operations, elements, and/or components, but do not themselves preclude the presence or addition of one or more other features, characteristics, steps, operations, elements, components, and/or groups thereof. Rather, exclusive modifiers like "only" or "singular" may preclude presence or addition of other subject matter in modified terms. The use of permissive terms like "may" or "can" reflect optionality such that modified terms are not necessarily present, but absence of permissive terms does not reflect compulsion. In listing items in example embodiments, conjunctions and inclusive terms like "and," "with," and "or" include all combinations of one or more of the listed items without exclusion. The use of "etc." is defined as "et cetera" and indicates the inclusion of all other elements belonging to the same group of the preceding items, in any "and/or" combination(s). Modifiers "first," "second," "another," etc. may be used herein to describe various items, but they do not confine modified items to any order. These terms are used only to distinguish one element from another; where there are "second" or higher ordinals, there merely must be that many number of elements, without necessarily any difference or other relationship among those elements.

When an element is related, such as by being "connected," "coupled," "on," "attached," "fixed," etc., to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.).

As used herein, singular forms like "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. Relative terms such as "almost" or "more" and terms of degree such as "approximately" or "substantially" reflect 10% variance in modified values or, where understood by the skilled artisan in the technological context, the full range of imprecision that still achieves functionality of modified terms. Precision and non-variance are expressed by contrary terms like "exactly."

The structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations aside from exact operations described below. It should be presumed that any embodiment or method having features and functionality described below, in any workable combination, falls within the scope of example embodiments.

The inventor has recognized that despite the widespread use of silver as an antibacterial agent, the silver solutions are generally light-sensitive formulations comprising of silver nanoparticles or in the form of zeolites. These solutions have a limited stability and pH concerns, therefore limited shelf life. Accordingly, there is a need to create stable and light insensitive formulations with a potent anti-microbial activity. The methodology of example embodiments results in a potent disinfectant composition with neutral pH and instant kill activity, besides being cost effective, light stable and environmentally friendly.

The present invention is antimicrobial disinfectants and systems and methods for producing the same. In contrast to the present invention, the few example embodiments and example methods discussed below illustrate just a subset of the variety of different configurations that can be used as and/or in connection with the present invention.

An example embodiment relates to an anti-microbial composition which can effectively neutralize microorganisms on the hard surfaces by providing for a light stable, antimicrobial aqueous disinfectant comprising of silver salts with bio polymer and chelating agent. Further disclosed is a non-toxic disinfectant composition with neutral pH, comprising of active metal salts for disinfection and method of preparing the same. The resultant formulation is colorless and odorless. The solid content in the aqueous formulation comprises only ~6-7% wt/volume (w/v). The bio-polymers and chelating agents are widely used materials in the food and cosmetics industry and are known to be of low acute toxicity when administered by the intravenous route in humans or by the oral and intravenous routes in various species of laboratory animals. They are not known to bio-accumulate or cause any eco-toxicity.

Reference may be made to FIG. 1 illustrating the methodology for the preparation of the composition, in accordance with an example embodiment. An example embodiment discloses a process of preparing an antimicrobial disinfectant composition, comprising the steps of: a) weighing out 70-90% of the water required in the container and deoxygenating it using nitrogen gas; b) preparing the matrix by addition of chelating agents in the deoxygenated water obtained in step a; c) adding silver salt to the solution obtained in step b); and d) adding the bio-polymer to the composition obtained in step c) with gentle stirring and making up the final volume with water. Further, the pH adjusters are added to maintain the pH in the range of 7 to 9. (FIG. 1).

According to a non-limiting exemplary embodiment, ASTM B-117 salt spray test results were seen with no red or white rust observed in the stainless steel panels treated with the anti-microbial composition even after 48 hrs., in accordance with an example embodiment.

Figure 2:
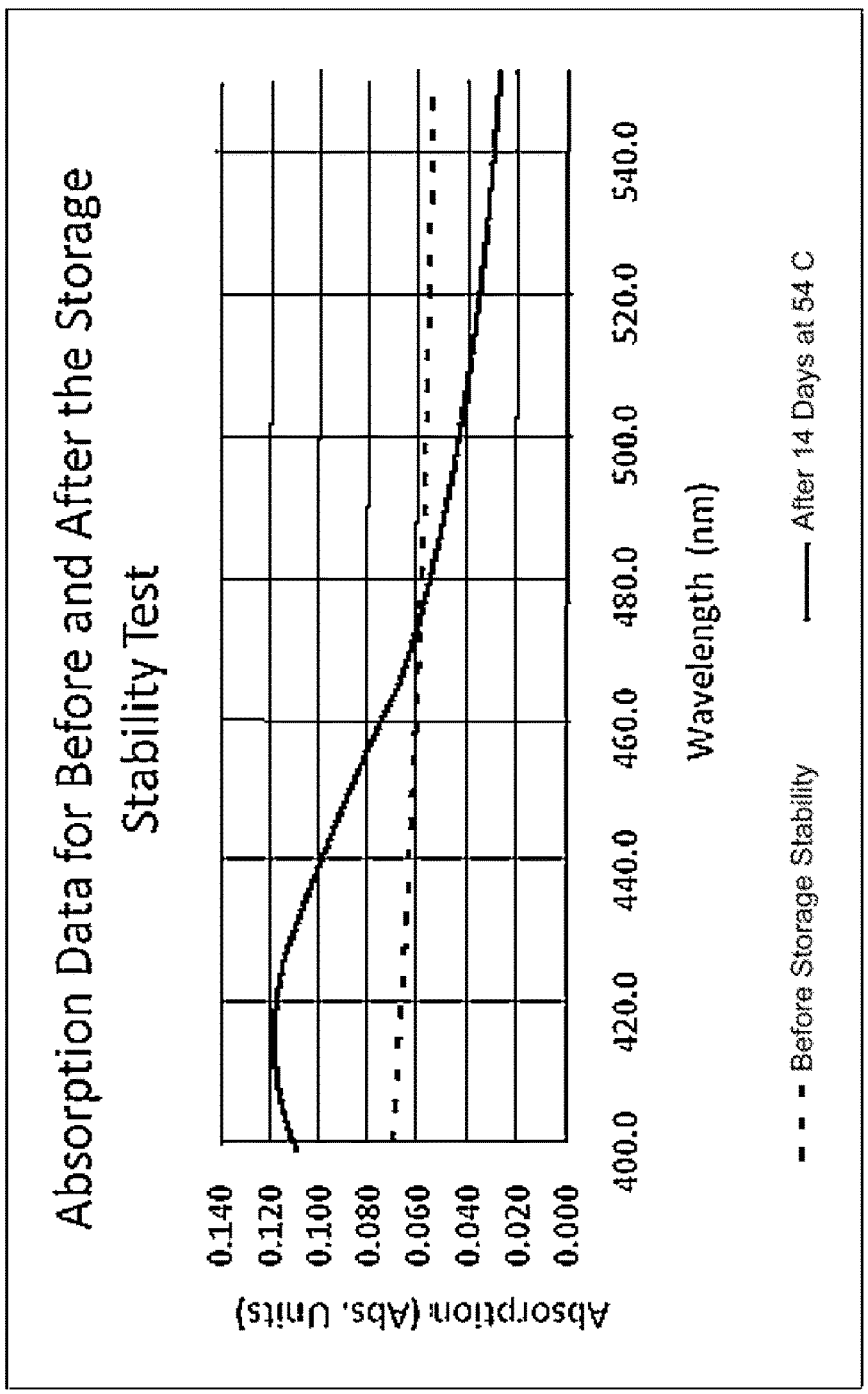
FIG. 2 illustrates the absorption data for the storage stability test for the composition, in accordance with an example embodiment.

Reference may be made to FIG. 2 illustrating the absorption data for the storage stability test for the composition, in accordance with an example embodiment; and An example embodiment discloses an antimicrobial disinfectant composition comprising at least one or more antimicrobial metal in a concentration sufficient to provide anti-microbial effect; a chelating agent; and a hydrophilic bio-polymer in distilled water.

An example embodiment discloses an antimicrobial disinfectant composition comprising: a silver salt 0.1-2% (w/v); a chelating agent 1-10% (w/v); and a polymer 1-10% (w/v); wherein the pH of the disinfectant composition is greater than or equal to 7 and less than or equal to 9. The pH adjusters such as phosphate buffers, sodium and potassium hydroxide may be used to maintain the pH around neutral.

An example embodiment discloses an antimicrobial disinfectant composition wherein the silver salt is selected from a group comprising water soluble silver salts such as silver nitrate, silver chloride, silver fluoride, silver sulphate, silver acetate, silver lactate and silver carbonate, but not limited to. Further, the chelating agent is selected from a group comprising of ethylenediaminetetraacetic acid (EDTA) salts such as disodium EDTA, sodium calcium edetate, and tetrasodium EDTA, dimercaptosuccinic acid, dimercaptopropane sulfonate and dimercaptol, but not limited to; where the chelating agents work by binding to metals, with the role is to keep the silver ions bound and prevent its oxidation. The polymer in the composition is selected from a group comprising hydrophilic bio polymers such as poly vinyl pyrrolidone, polyethylene glycol, poly vinyl alcohol and combinations thereof, but not limited to.

An example embodiment discloses the method wherein the polymer added in the range 1-10%, makes hydrogen bonds with the surface to further improve disinfectability or to provide residual stability in the composition.

An example embodiment discloses an aqueous antimicrobial disinfectant composition, which may comprise powdered form, tablet or capsule containing the antimicrobial powder, or antimicrobial solutions in the form as aerosols, infusions, sprays, mist, drops, or one or more liquids formulations, but not limited to. Further, the disinfectant shows instant kill activity with decontaminating the surface within 30 seconds of exposure time, wherein the surface is a hard surface.

Accordingly, the silver content in the composition is measured by standard titration with thiocyanate ion. The proportion of biopolymer is carefully chosen so as to yield maximum wettability on the surface and formation of a thin film that would be almost invisible when fogging surfaces.

EXAMPLES

Example 1: In 1 liter water, 12.5 g of the sodium salt of EDTA was dissolved and followed by the addition of 100 mg of the silver nitrate salt. This resulted in formation of a clear solution, to which 5 g of poly vinyl pyrrolidone (PVP) was added and the solution was stirred well, and pH was brought up to a neutral level. This resulted in a light insensitive and stable solution as the silver ion content when measured over a period of several weeks, remained constant around 56±2 ppm by standardized titration methods with thiocyanate ion. The procedure consisted of titration of silver(I) with a standard potassium thiocyanate (KSCN) solution with the reaction as: $Ag^+ + SCN^- \leftrightarrow AgSCN$ The titration was carried out in an acidic solution. When the silver (I) precipitated as white silver thiocyanate, the first excess of titrant and the iron (III) indicator reacted and formed a soluble red complex. Concentrated nitric acid was then added to prevent hydrolysis of the ferric ammonium sulphate which had been used as an indicator. The standardized thiocyanate solution was then added drop by drop from the burette into the silver sample until the faint brownish color did not disappear under vigorous stirring. The volume of thiocyanate, at the point when the color first becomes permanent was noted and the normality of the silver in the formulation was calculated. The observed sensitivity was approximately ±2 ppm of predicted values and validated with standard testing consisting of Atomic Absorption Spectroscopy.

Example 2: ASTM E-2315 Test was used to assess the in vitro reduction of a microbial population of test organisms after exposure to the disinfectant composition (test material), which was a time kill study of the sample on *E. coli*. In this, a pure culture of *E. coli* was streaked on Soyabean Casein Digest Agar plates and incubated at 37° C. for up to 2 days. Following incubation, the surface of agar plate was scraped and the growth suspension was adjusted to a concentration of 106 cfu/ml. Test and control substances were dispensed in identical volumes to sterile test tubes. Independently, Test and Control substances were inoculated with the test microorganism, mixed and incubated. Control suspensions were immediately plated to represent the concentration present at the start of the test, or time zero and at the conclusion of each contact time; a volume of the liquid test solution was neutralized. Dilutions of the neutralized test solution were placed on to appropriate agar plates and incubation temperatures to determine the surviving microorganisms at the respective contact times and reductions of microorganisms were calculated by comparing initial microbial concentrations to surviving microbial concentrations. The sample showed 99.9999% reduction on exposure to *Escherichia coli* when exposed for just 15 seconds (Table 1), thereby instant killing activity of the composition as compared to the control.

TABLE 1

Experimental Results for ASTM E-2315 Test

| Microorganism | Contact time | CFU/ml | % Reduction | Log10 Reduction |
|---|---|---|---|---|
| Escherichia coli | Time Zero | 2.5 × 106 | NA | NA |
| | 15 sec | <1 | 99.9999% | 6 log |
| | 30 sec | <1 | 99.9999% | 6 log |
| | 45 sec | <1 | 99.9999% | 6 log |
| | 60 sec | <1 | 99.9999% | 6 log |

Example 3: ATP TEST: ATP test was done for rapidly measuring the actively growing microorganisms through detection of adenosine triphosphate, or ATP, which gave the direct measure of biological concentration and health. An ATP reading of 0-20 generally indicated an ultraclean to clean surface.

A standard ATP meter was used for the measurement of the surfaces after the spray of disinfectant compositions with and without biopolymer. After spraying of above solution on various surfaces such as cardboard, wood, glass, SS and plastic ATP readings of around 10 to 15 were noted. The readings remained in the same range even 30 days after the application. However, in the case where the bio-polymer was not mixed into the formulation—the ATP readings were higher after the 30 days interval, thereby showing the presence of contaminants. Especially on a working table made of wood and having a lot of mechanical abrasion, when treated with the "without polymer composition", a rapid increase in the readings to about 30 to 40 Relative Light Units (RLU's) after 30 days was recorded, showing the presence of contaminants. These results showed that addition of the bio-polymer conferred the disinfectant the ability to bind, which in turn resulted in prolonged antimicrobial activity of the disinfectant on the surface.

Example 4: ASTM B-117 salt spray test, a corrosion test was done to provide corrosion resistance information on metals and coated metals. The NaCl concentration (w/v %) was set at 4.0-6.0 and the saturation air temperature was 47+0.1 C, pH 6.5-7.2 6. Temp. of Saltwater Compressed Air (kg/cm1+0.1 7. Temp. of chamber 35+0.1. No Red or White rust was observed in the stainless steel panels treated with the anti-microbial composition even after 48 hrs.; however untreated panels in 1B control got few red rust spots after 48 hrs. (FIG. 2). The results of ASTM B-117 salt spray test stated that the composition was corrosion resistant.

Example 5: Neutralizer Test: Disinfectant composition comprising 0.02% (w/v) Silver salt, 3% chelator and 1% polymer was checked for the antimicrobial efficacy on Stainless Steel (SS) substrates. For the SS study the test culture used was *S. aureus* (ATCC 6538) and the neutralizer used was the Dey Engley Neutralizing Broth (DENA broth). The culture was incubated at 37° C. for 24 h. The media and reagent used was the Soyabean Casein Digest Agar.

DENA broth neutralizes a broad spectrum of antiseptics and disinfectants including quaternary ammonium compounds, phenolics, iodine and chlorine preparations, mercurials, formaldehyde and glutaraldehyde. In the results, neutralizer effectiveness was monitored. In the Test sample A as compared to control (Table 2). The results were given in percentages only. The Neutralizer toxicity and test organisms' viability was also measured and verified.

TABLE 2

Results from the Neutralizer test

| Test | Particulars | Control (number of colonies) | Test Results (number of colonies) | % Recovery of control |
|---|---|---|---|---|
| Test A Neutralizer Effectiveness | Exposome-B + DENA + Organisms | 90 | 82 | 91.11 |
| Test B Neutralizer toxicity | DENA + Organisms | | 89 | 98.88 |
| Test C Test Organisms Viability | Phosphate buffer + organisms | | 84 | 93.33 |

From the observations, 99.9999% reduction for antimicrobial activity against *S. aureus* bacteria was observed on the SS substrate treated with the composition (Table 3).

TABLE 3

Results showing reduction of bacteria on the ss surface, with Number of Bacteria on Untreated SS Substrate: 4.2 × 106 cfu/ml

| Sample | Bacteria on Treated SS Substrate CFU/ml | % Reduction | Log value | Antibacterial activity (Log reduction) |
|---|---|---|---|---|
| Control | 3.4 × 106 | — | 6.531 | — |
| Our formulation | 2 | 99.9999 | 0.301 | 6.230 |

Further, Zone of inhibition for *S. aureus* and *P. aeruginosa* was detected as 24.78 mm and 24.99 mm respectively (Table 4). The results thus stated the neutralizer effectiveness and anti-microbial disinfectant activity of the composition.

TABLE 4

Analysis Results for Zone: Concentration of sample: Neat

| Name of Organism | S. aureus (1.3 × 106 CFU/ml) | P. aeruginosa (2.7 × 106 CFU/ml) |
|---|---|---|
| | Zone of inhibition (mm) | |
| Antibacterial Activity | 24.78 Observed | 24.99 Observed |

Example 6: Skin Safe Test: The disinfectant sample was applied on the hands of five volunteers after the consented approval. No rashes, itchiness, irritation or reddening was observed on the skin of the volunteers even after 5 hours of application. The disinfectant composition thus is a skin friendly composition, causing no harm even in case of accidental spillage.

TABLE 5

Response of Volunteers After 5 hr.

| Test | 1 | 2 | 3 | 4 | 5 | Remarks |
|---|---|---|---|---|---|---|
| Rashes | 0 | 0 | 0 | 0 | 0 | No side |
| Itchiness | 0 | 0 | 0 | 0 | 0 | effects were |
| Irritation | 0 | 0 | 0 | 0 | 0 | observed |
| Reddening | 0 | 0 | 0 | 0 | 0 | after 5 hr. of |
| Any other Information | None | None | None | None | None | application |

Skin safe test results with the Rating Scale as:
0-2—No effect;
3-5—slight;
6-8—moderate;
9-10—very high Example 7: Interim Data: The interim method includes an efficacy assessment of the coated coupons following exposure to certain chemical solutions/mechanical abrasion. The motivation is to check for supplemental residual efficacy when the disinfection events are well spaced out. The test method provides for the evaluation of durability and the baseline efficacy of these treated surfaces against *Staphylococcus aureus* and *Pseudomonas aeruginosa*; the method can be adapted for additional microbes and viruses. A minimum 3 log reduction of test microbes within 1-2 hours is the required level of performance. The USEPA interim method to support efficacy requirements for the registration of coatings applied to surfaces that are intended to provide residual antimicrobial activity for a period of weeks and are designed to be supplements to standard disinfection practices.

In brief, the test method comprised of two parts: 1) chemical treatment and abrasion, and 2) product efficacy. The method used 1"×1" brushed stainless-steel carriers coated with the antimicrobial chemical and uncoated control carriers. Carriers were exposed to 10 cycles of chemical treatment/abrasion in order to support a 1-week duration label claim of residual activity. Testing could be scaled up to support longer claims up to 4 weeks. The chemical exposure and abrasion processes were intended to represent a degree of normal and relevant physical wear, as well as reproduce potential effects resulting from repeated exposure of anti-microbial coated surfaces to three different biocidal materials (chemical solutions) as well as the impact of dry abrasion. Under controlled environmental conditions, the carriers received a 20 µL mixture of the test organism and soil load. Following a recommended 1-2 hour contact time, the carriers were neutralized and the number of viable microorganisms was determined quantitatively. The log reduction (LR) in the viable test organisms on exposed carriers was calculated in relation to the viable test organisms on the unexposed control carriers. The impact of the chemical exposure and abrasion on product efficacy was also determined by comparing carriers with and without coating not exposed to chemical treatment and abrasion.

The chemical exposure/abrasion cycle for a single chemical (Treatments A, B, and C) was done using a wetted sponge with a weight of 454 g. The dry abrasion treatment (Treatment D) was done using a dry sponge without additional weight to perform sixteen single passes across the carriers. 10 abrasion cycles were performed (80 single passes across the surface of the carrier for treatments A, B, and C; 160 single passes across the surface of the carrier for Treatment D with appropriate dry times between abrasion cycles on Lot 1 to support a 1-week residual claim. The number of abrasion cycles performed was made for residual claims of 4 weeks. The results were promising in that the mechanical abrasion in the wet and dry states showed a 4 log reduction. In the presence of cleaning chemicals also there was a good antimicrobial ability.

TABLE 6

Results with test sample

Name of Organism
Ps. Aeruginosa

| Chemical Treatment | Coated (C) | Count Observed | Log Value | Without coated (WC) | Count observed | Log Value | % reduction |
|---|---|---|---|---|---|---|---|
| | 1C | nil (cfu/ml) | 0* | 6 WC-Plain SS | 20000 | 4.30 | 99.995 |
| NAOCL | 2C-A | nil (cfu/ml) | 0* | 7 WC-A | 30 | 1.49 | 96.667 |
| 6% H2O2 | 3C-B | 50 | 1.698970004 | 8 WC-B | 100 | 2.00 | 50.000 |
| 2% BKC | 4C-C | nil (cfu/ml) | 0* | 9 WC-C | 190 | 2.28 | 99.474 |
| | 5C-Dry | nil (cfu/ml) | 0* | 6 WC-Plain SS | 26000 | 4.419 | 99.996 |
| Control | | Positive control | | | 2.8 × 108 CFU/ml | | |
| | | Media control | | | No Turbidity | | |
| | | Neutralizer control | | | No Turbidity | | |

*taken as zero for calculation

As per the above observations it was concluded that the test sample showed 4 log reductions and (99.995%) bactericidal activity when compared to the without coated carrier specimen both in the wet and dry.

For the coated specimen treated with 3 chemical treatments

Sodium hypochlorite solution (A) compared with uncoated specimen showed 96.66% reduction. There were no colonies (growth) observed on the coated sample whereas for the uncoated there were 30 colonies observed.

6% hydrogen peroxide solution (B) compared with uncoated specimen showed 50% reduction.

2% Benzalkonium Chloride solution (C) and compared with uncoated specimen showed 99.47% reduction. No colony (growth) was observed on the coated sample whereas for the uncoated 190 colonies were observed.

Example 8: Storage Stability Test: The samples were held in an oven at 54° C. for 14 days. No visible clumping or deterioration of the product was observed that would interfere with its disinfectant ability. The absorption data for the storage stability test is shown in FIG. 2. The zone of inhibition was also checked for the solution kept for 14 days in the oven and slight change in the zone diameters was observed (possibly due to loss of some water) but the results confirmed the intact disinfection ability of the solution even after 14 days (Table 7).

TABLE 7

Analysis Results for Zone: with sample stored for storage stability test for 14 days

| Sample Name | 20210602#2 Before storage | 20210602#2 After storage |
|---|---|---|
| Name of Organism | Zone of inhibition (mm) | |
| P. aeruginosa (3.8 × 10⁶ CFU/ml) | 25.80 | 27.51 |
| S. aureus (2.9 × 10⁶ CFU/ml) | 47.56 | 38.82 |
| Antimicrobial Activity Observed/Not observed | Observed | Observed |

Example 9: Particle Analysis: The particle analysis was done using a Laser Diffraction (LD) analyzer, a particle size analyzer that used three precisely placed red laser diodes to accurately characterize particles by utilizing Mie compensation for spherical particles and the proprietary principle of Modified Mie calculations for non-spherical particles. The resolution of the tool was from 0.01 to 2,800 μm. Any light obscuration depicts the presence of nanoparticles in the composition. The results did not show any light obscuration and no particles were detected in the range. The experiments were repeated thrice and the absence of any light obscuration thereby confirmed that there was no nanoparticle contamination in the disinfectant composition.

TABLE 8

The different parameters of the composition studied are summarized in the table.

| Parameter | Result | Inference |
|---|---|---|
| PH | ~7-9 | near neutral composition |
| Staining | Colorless non-staining | Colorless solution |
| Odor | Odorless | Odorless |
| Corrosiveness ASTM B-117 | No red/white rust after 48 hours salt-spray | Corrosion resistant |
| Accelerated Storage stability | Stable after 14 days at 54° C., absorption spectroscopy and active concentration monitored | Stable after 14 days at 54° C. |
| AOAC like Use Dilution method (Pilot study) | 6 log reduction at LCL (contact time 5 min) with bacteria | Effective even at low concentration |
| Interim Method for Evaluating the Efficacy of Antimicrobial Surface Coatings (Pilot study) | Passes 4 week testing at LCL with gram positive and negative bacteria, with no growth on the surface even after 4 week, | Stable composition with prolonged effect |
| Dermal Test | No Rashes, itchiness, irritation or reddening of skin even after 5 hours of application | Nontoxic to the dermal surfaces |
| Analytical enforcement method for the active | Established. Observed sensitivity is approximately ±2 ppm of predicted values and validated with standard testing | Validation with standard testing. |
| Concentrated form possibility | Yes. 1:10 dilution of the concentrate to the LCL | Scalable composition |

Advantages of example embodiments as compared with the existing formulations is to provide a big change in the field of disinfectants and sanitizers. The formulations were prepared with typically 0-2% of the salts and then the biopolymer was added to impart the "sticking" property so that the formulation continues to have a long-lasting residual efficacy. This is a low cost, light stable formulation with results showing instant eradication of pathogens from the hard surface such as stainless steel, plastic, glass etc. Besides, being a colorless composition, it eliminates the after usage concern of stains. Further, the composition may comprise the form of a liquid formulation, aerosol, foam, spray, powdered form or pellets, where it can be formulated to a higher concentration of up to 10:1. Conventional and non-conventional methods may be used for application including but not limited to: roll coating, dipping, spraying, or rotational tumbling. The silver EDTA powder after the removal of unwanted anions and cations by ion exchange can be isolated, which can further be stored as a powdered disinfectant, thereby lowering the plastic waste and transportation cost.

The silver-EDTA complex formed in the reaction has technical advantages over antimicrobial drugs and disinfectants. First, EDTA is a hexa-dentate molecule due to which, Ag+ ions are tightly bound and delivered gradually. The high reactivity of the silver complex triggers elevated intracellular levels of reactive oxygen species (ROS) provoking the disruption of lipids, proteins and DNA, ending in cell death of the microbes. Secondly, since no specific antimicrobial target mechanism exists; thus, antimicrobial resistance is unlikely for such combinations. The water soluble bio polymers such as poly vinyl pyrrolidone (PVP) make hydrogen bonds with the surface due to which the antibacterial activity remains for a longer time on the surface and thus in turn providing long residual activity of the disinfectant.

Example embodiments provide pH neutral composition as compared to the acidic pH ones of the prior arts; light stable silver composition whereas the prior arts available are light sensitive formulations; heat resistant at least till 54° C. applied over a period of 14 days; and/or stable coating having residual efficacy wherein the "coating" formed was not removed even with 4 weeks of simulated mechanical agitation using 3 types of cleaning chemistries; colorless composition so no concern of stains after use Composition may comprise the form of a liquid formulation, aerosol, foam, spray, where it is a scalable composition up to 10:1; and/or silver EDTA powder isolated as a powder after ion exchange, can be stored as powdered disinfectant, thereby lowering the plastic waste and transportation cost.

It will be further appreciated that functions or structures of a plurality of components or steps may be combined into a single component or step, or the functions or structures of one-step or component may be split among plural steps or components. Example embodiments contemplate all of these combinations. Unless stated otherwise, dimensions and geometries of the various structures depicted herein are not intended to be restrictive, and other dimensions or geometries are possible. In addition, while a feature may have been described in the context of only one of the illustrated embodiments, such feature may be combined with one or more other features of other embodiments, for any given application. It will also be appreciated from the above that the fabrication of the unique structures herein and the operation thereof also constitute example methods. Example embodiments also encompass intermediate and end products resulting from the practice of the methods herein.

Some example embodiments and methods thus being described, it will be appreciated by one skilled in the art that examples may be varied through routine experimentation and without further inventive activity. For example, although liquid solutions are generated in some example systems, it is understood that other delivery forms including powders and tablets are useable with examples. Variations are not to be regarded as departure from the spirit and scope of the example embodiments, and all such modifications as would be obvious to one skilled in the art are intended to be included within the scope of the following claims.

The invention claimed is:

1. An aqueous antimicrobial disinfectant composition consisting of:
    a silver salt 0.1-2% w/v;
    at least one chelating agent 1-3% w/v;
    polyvinyl pyrrolidone 1-10% w/v;
    water and a pH adjuster, wherein the pH of the disinfectant composition is greater than or equal to 7 and less than or equal to 9.

2. The composition of claim 1, wherein the silver salt is a water soluble silver salt.

3. The composition of claim 2, wherein the water soluble silver salt is silver nitrate, silver chloride, silver fluoride, silver acetate, silver citrate, silver lactate, silver sulphate, and/or silver carbonate.

4. The composition of claim 1, wherein the chelating agent is a Ethylenediaminetetraacetic acid (EDTA) salt.

5. The composition of claim 4, wherein the EDTA salt includes at least one of, disodium EDTA, sodium calcium edetate, tetrasodium EDTA, dimercaptosuccinic acid, dimercapto-propane sulfonate, and dimercaptol.

6. The composition of claim 1, wherein the composition is for disinfecting a surface and is in the form of a powder, tablet, or capsule containing the antimicrobial powder, or antimicrobial solutions in the form of aerosols, infusions, sprays, mist, drops, or one or more liquid formulations.

7. The composition of claim 6, wherein the surface is a hard surface, and wherein the disinfectant composition decontaminates the surface with kill activity within 30 seconds of exposure time.

8. A process of preparing an aqueous antimicrobial disinfectant, the method consisting of:
    deoxygenating water using nitrogen gas;
    preparing a matrix by adding chelating agents to the deoxygenated water;
    adding silver salt to the matrix to prepare a composition;
    adding polyvinyl pyrrolidone to the composition with gentle stirring;
    making up the final volume with water; and
    adding pH adjusters to maintain pH in the range of 7 to 9.

9. The process of claim 8, wherein the chelating agents include EDTA, and wherein Ag+ ions tightly bind to a hexadentate ligand structure of the EDTA resulting in the generation of a highly reactive silver EDTA complex.

10. The process of claim 8, wherein the pH adjuster is phosphate buffers, sodium, and/or potassium hydroxide to maintain the pH around neutral.

11. The process of claim 8, wherein the polyvinyl pyrrolidone makes hydrogen bonds with the surface.

12. The process of claim 8, wherein the created disinfectant decontaminates a surface with kill activity within 30 seconds of exposure time.

* * * * *